Nov. 6, 1962 W. E. W. JACOB 3,062,919

PULSE TRANSMISSION SYSTEM

Filed Aug. 13, 1958 3 Sheets-Sheet 1

INVENTOR
WALTER EMIL WILHELM JACOB

BY Kane and Nydick
ATTORNEYS

INVENTOR
WALTER EMIL WILHELM JACOB
BY Kane and Nydick
ATTORNEYS

Nov. 6, 1962 W. E. W. JACOB 3,062,919

PULSE TRANSMISSION SYSTEM

Filed Aug. 13, 1958 3 Sheets-Sheet 3

INVENTOR
WALTER EMIL WILHELM JACOB
BY Kane and Nydick
ATTORNEYS

United States Patent Office 3,062,919

Patented Nov. 6, 1962

3,062,919

PULSE TRANSMISSION SYSTEM

Walter Emil Wilhelm Jacob, Hagersten, Sweden, assignor to Telefonaktiebolaget L M Ericsson, Stockholm, Sweden, a corporation of Sweden Filed Aug. 13, 1958, Ser. No. 754,758
Claims priority, application Sweden Aug. 29, 1957
4 Claims. (Cl. 179—15)

Figure 1:
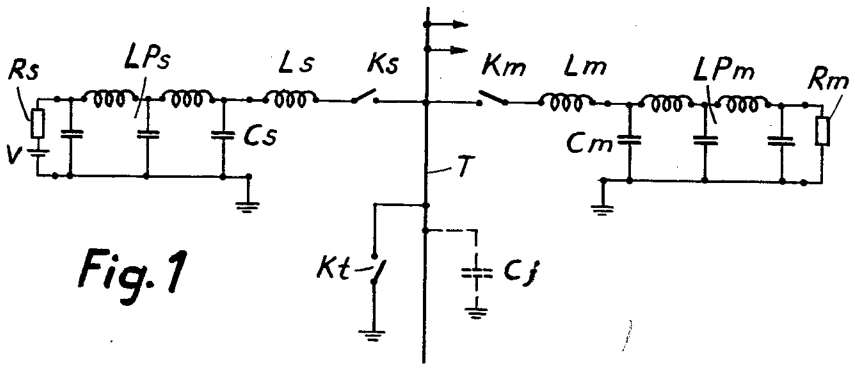

The present invention refers to a pulse transmission system for improving the efficiency when transmitting energy from a transmitter to a receiver.

In electronic telephone systems the different switching devices in the speak paths are often used for several simultaneous communications. Usually a time divided multiplex system is used, where the pulses are modulated in a known way. Usually the pulses have constant time position and duration, while the amplitude is modulated. In its simplest form such a pulse transmission system consists of a number of subscribers' stations, which each via a contact are connected to a common transmission medium. The contacts pertaining to a certain connection between a calling and called subscriber are cyclically closed during the time interval of each period allotted to the connection in question. The information signals are thus passing the common speak path as mutually time displaced modulated pulses. A low pass filter is connected between the subscriber and his contact. This filter, or more exactly, its terminating condenser turned against the contact operates as an energy accumulator, which accumulates energy during the pauses between the consecutive pulses. In order to improve the efficiency when transmitting energy from the transmitter, it is known e.g. through Ericsson Review No. 1, 1956, page 10, to connect an inductance between the low pass filter and the contact. This inductance is so dimensioned that it together with the terminating capacity of the low pass filter forms a tuned circuit, the period of which is equivalent to twice the contact make time. In this way the wave form of the current pulse, which transmits energy from the transmitter to the receiver is favourable, and as a matter of fact the whole energy will be transferred.

In practice difficulties are, however, found how to utilize the known device mentioned above, especially when building up a system having a great number of electronic contacts, as required in an electronic telephone system. With an increasing number of contacts the common transmission medium will get an increasing geometric extent so that its capacity to earth cannot be neglected. The electronic contacts have also certain leakage capacities, which are added to the earth capacity of the transmission medium. During energy transmission between the transmitter and the receiver this resulting earth capacity will be charged and for preventing cross-talk it must be discharged between the pulses, which, of course, causes an attenuation.

According to the invention the disadvantages of earth capacities can be avoided by a pulse transmission system, where the information signals of the individual connections are transmitted from a terminal to another via a transmission medium common to the connections as modulated pulses, and where the transmission medium is connected to each terminal via a contact, an inductor coupled in series to the contact, and a low pass filter, the terminals of which turned against the inductor are terminated by a condenser, which together with the inductor forms a tuned circuit, the resonance period of which is substantially equal to twice the time, during which the contacts are closed for transmitting a pulse. The invention is characterized by a capacitive circuit being connected between the common transmission medium and the generally grounded terminal of the low pass filter tuned against the transmission medium, which pole is not connected to the inductor, said circuit having together with the common earth capacities of the transmission medium and the contacts connected to the same such a value that it together with said inductors and said condensers forms a tuned circuit with a resonance frequency, which is an even multiple of the resonance frequency of the first mentioned resonance circuit.

Figure 2:
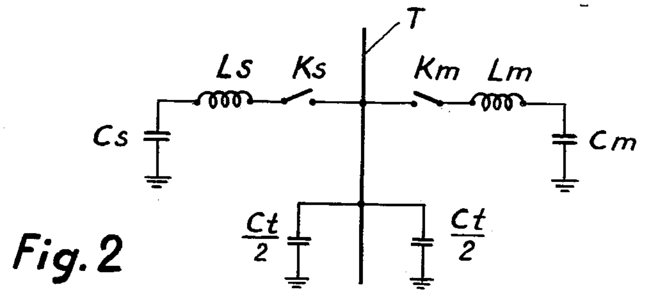
Figure 7:
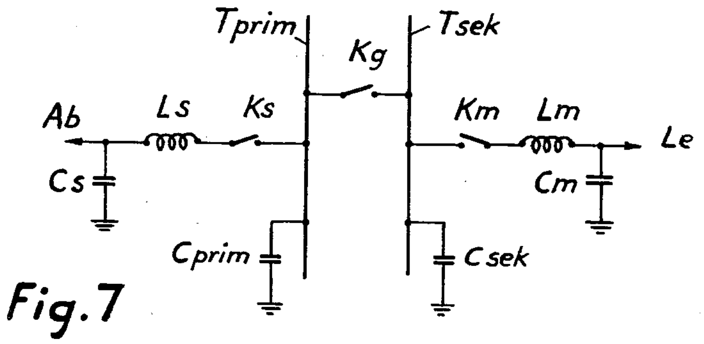
Figure 3:
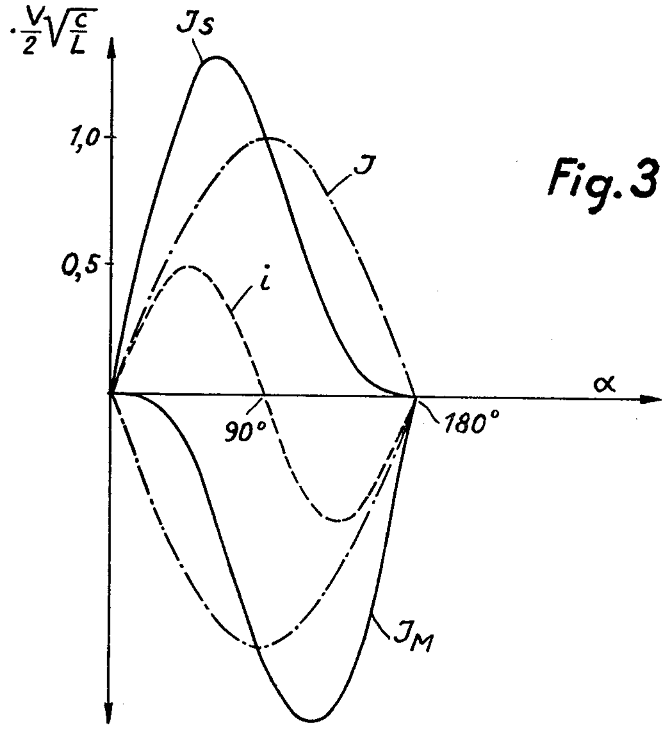
Figure 4:
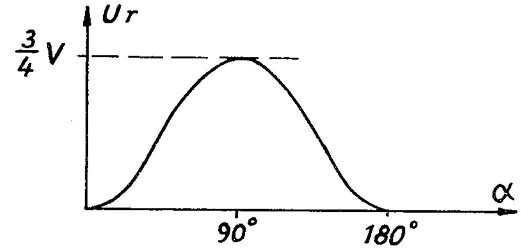
Figure 5:
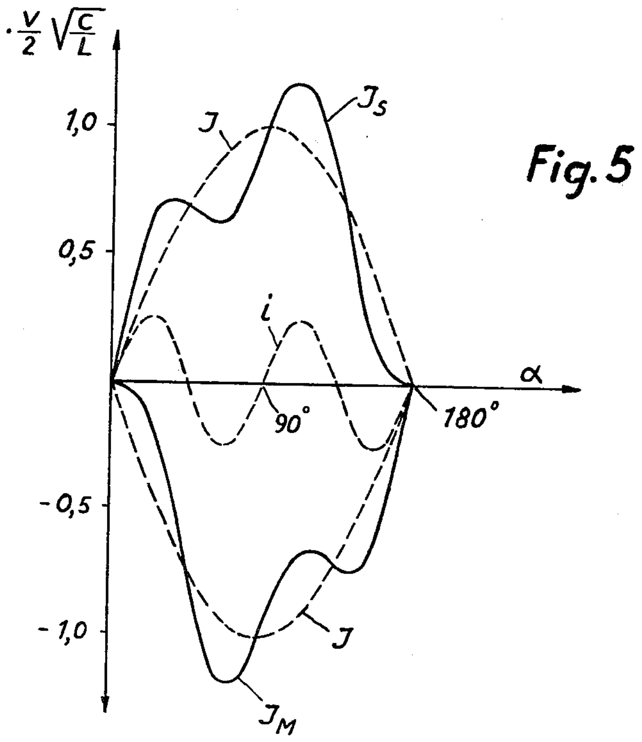
Figure 6:
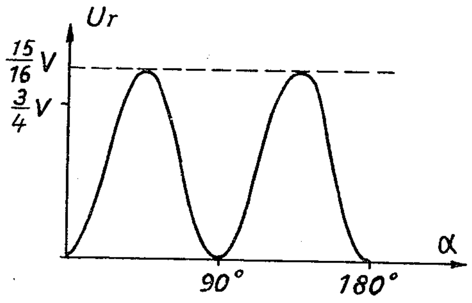

The invention will be more detailed described in connection with attached figures, where, FIG. 1 shows a simplified schematic diagram of a known pulse communication station, FIG. 2 shows a simple equivalent circuit illustrating the principle of the invention, FIGS. 3 and 4 show voltage and current wave forms at a certain dimensioning of the device according to the invention, FIGS. 5 and 6 show voltage and current wave forms at another dimensioning, while FIG. 7 shows equivalent circuit with the subscribers divided in groups, which may be mutually connected.

In FIG. 1 the transmitter, which in an electronic telephone system comprises a subscriber's apparatus or a line, is supposed simplest to consist of a direct current source V having the internal resistance $R_s$. The receiver, which in practice consists of the subscribers' apparatus just receiving, has the internal resistance $R_m$, which in a known way is to be equal to the internal resistance $R_s$ of the current source V. In the transmission path there are two low pass filters $LP_s$ and $LP_m$ on the transmitting and the receiving side, respectively. The filters $LP_s$ and $LP_m$ are matched to the internal resistance $R_s$ and the load resistance $R_m$, respectively, and their terminals turned against the transmission path are terminated by the condensers $C_s$ and $C_m$, respectively. The specific pulse transmission system is located between the two condensers $C_s$ and $C_m$, said pulse transmission system consisting of two contacts $K_s$ and $K_m$, which cyclically during relatively short time intervals connect the transmitter to the receiver over a common transmission medium T. Usually several transmitters and receivers are connected to this transmission medium.

An inductor, $L_s$ respectively $L_m$, is connected between each contact and the pertaining low pass filter as well on the transmitter as on the receiver. The inductors $L_s$ and $L_m$ form together with the condensers $C_s$ and $C_m$, respectively, a tuned circuit, which in a known way is so tuned that the resonance period is equal to twice the time, during which the contacts are closed for the cyclical interconnection of the transmitter and the receiver, i.e. the impulse time. By dimensioning the tuned circuits in this way the whole charge difference between the condensers $C_s$ and the condenser $C_m$ is transferred from the condenser $C_s$ to the condenser $C_m$ during the time when the pertaining contacts $K_s$ and $K_m$ are closed. That also means that the voltage states prevailing across the condensers $C_s$ and $C_m$ immediately before closing the contacts, have changed place, when the contacts are opened again.

If bilateral contacts are used, it is possible to transmit energy in both directions, i.e. the transmitter can also operate as a receiver, which is the case in usual telephone systems. The device is thus a two-wire communication system, which by using rapid electronic contacts is suitable for speak transmission in an electronic telephone exchange. For speak transmission a switching frequency (pulse repetition frequency) of 8000–10000 Hz. is selected and the cut off frequency of the low pass filter is selected somewhat less than half the pulse repetition frequency. The cut off frequency and the impedance of the filters define the size of the condensers $C_s$ and $C_m$, and therefore the inductance of the coils $L_s$ and $L_m$ is settled by the selected contact close time.

When using a device according to FIG. 1 in practice certain difficulties will arise, especially if a great number of transmitters and receivers are connected to the common transmission medium, which for instance is the case in electronic telephone systems.

When the number of subscribers is great, the geometric extent of the transmission medium T will, however, be so large that its capacity to earth cannot be neglected. Also the contacts K*s* and K*m* connected to the transmission medium T have certain capacities, which are added to the above mentioned capacity. All these capacities can be joined together in the capacity shown in FIG. 1.

Under suitable circumstances, when C*j* is negligible, the voltage of the transmission medium T is equivalent to half the sum of the voltages across the condensers C*s* and C*m* during the time the contacts are closed and a pulse is transmitted. As soon as the leakage capacity C*j* is added, the voltage wave form during the pulse is superimposed by an oscillation, which arises between the capacities C*s* and C*j* on one hand and between the capacities C*m* and C*j* on the other hand. It may happen that the voltage between the transmission medium T and earth and therewith across the condenser C*j* has a high value at the end of the transmission pulse. Some part of the energy, which should have been transmitted from the condenser C*s* to C*m* or conversely, therefore remains in the condenser C*j*, from which it must be removed through a short circuiting contact K*t* for preventing the charge from appearing in next pulse channel, where it would cause a considerable cross talk. The tap of a part of the information carrying energy means on the other hand that the transmission pulse is attenuated and the efficiency of the connection is decreased.

According to the invention such an injurious rest charge is prevented by connecting further a capacity between the transmission medium T and the earth which together with the earth capacity C*j* to form a capacity C*t* between the transmission medium T and earth. This capacity C*t* is so dimensioned that the above mentioned oscillation gets such a waveform that the voltage of the transmission medium is zero or at least has a minimum at the end of the pulse. This occurs if the current through the condenser C*t* has a frequency, which is an even multiple of the resonance frequency of the tuned transmission circuit formed by the circuit elements C*s*, L*s*, L*m*, C*m*, i.e. if the resonance frequency for the elements C*s*, L*s*, L*m*, C*m*, is *f*, the frequency of the superimpoed oscillation across C*t* is equal to 2*n.f.*, where *n* is an integer. In practice only small values of *n*, e.g. 1 and 2, can, however, be used, as C*t* will be small with an increasing value on *n*.

For a more detailed explanation of the operation reference is made to FIG. 2, which is a simplified equivalent diagram for a pulse transmission device. The capacity C*t* is supposed to be divided in two equal condensers $$\frac{Ct}{2}$$

and moreover is presumed that $Cs=Cm=C$ and that $Ls=Lm=L$. The value of the condenser $$\frac{Ct}{2}$$

is equal to $$\frac{C}{a}$$

According to the above it is supposed that the tuned circuit, which contains the condenser C and $$\frac{C}{a}$$

in series with L has a resonance frequency, which is 2*n* times larger than the tuned circuit, which contains only C and L. This means that $$\frac{C\cdot\frac{C}{a}}{\left(C+\frac{C}{a}\right)C}=\frac{1}{4n^2}$$

i.e. $a=4n^2-1$ and $$Ct=\frac{2C}{4n^2-1} \qquad (1)$$

Suppose that the condenser C*s* is charged to a voltage V, while the voltages across the condensers $$\frac{Ct}{2}$$

and C*m* is zero. When the contacts K*s* and K*m* are closed, the charge of the condenser C*s* is transferred to the condenser C*m* in a course, which can be divided in the following superposed courses:

(A A current pulses goes from C*s* over L*s*, K*s*, K*m* and L*m* to C*m*. This pulse is a half sinusoidal wave, i.e. it has the same shape as if the capacity should be zero.

(B) Two pulses consisting of one or several half sinusoidal wave at the same time transfer energy from C*s* and C*m* to C*t* and back again to C*s* or C*m*, respectively. The output voltages across the capacities C*s* and C*m* are both the same and have the value $$Ut=\frac{V}{2}$$

It can be easily shown by an energy discussion that the peak value I for the current pulse according to point A above will be $$\hat{I}=\frac{V}{2}\sqrt{\frac{C}{L}} \qquad (2)$$

For estimating the behaviour of the current according to point B it is sufficient to study only one side of the transmission system e.g. the current in the elements C*s*, L*s*, K*s* and the left half $$\frac{Ct}{2}$$

of the capacity C*t*. Supposing that the condenser C*s* is charged to the voltage V/2 by studying the charges in the circuit, the following expression on the peak to peak value of the voltage U*t* of the transmission medium when the current is zero after a half period of the progress according to B is obtained.

$$\hat{\check{U}}t=\frac{V}{4}\left(4-\frac{1}{n^2}\right) \qquad (3)$$

By an energy discussion of the same kind which resulted in the Equation 2 the following expression for the peak value I for the current wave according to B is obtained.

$$I=\frac{V}{4n}\sqrt{\frac{C}{L}} \qquad (4)$$

As the connection generally is bilateral, the voltage across the condenser C*m* is in practice not zero in the first moment of a transmission pulse, as the receiver at the same time acts as a transmitter and vice versa. On the common transmission medium the voltage is on the other hand equal to zero before a transmission pulse, as means are provided for short circuiting the transmission medium to earth in the pause between two channel pulses in order to remove possible rest charges.

Under these circumstances it is easily understood that the expressions for currents and voltage can be generalized. Of course the difference between the voltages V*s* and V*m* across C*s* respectively C*m* will determine the occurrence according to A, i.e. V will be replaced by $Vs-Vm$ in the Equation 2. On the other hand half of the sum of the voltages $V_s$ and $V_m$ will determine the occurrence according to B, i.e.

$$\frac{V}{2}$$

will be replaced by the expression $$\frac{V_s+V_m}{2}$$

in the Equations 3 and 4.

The earlier shown equations for the currents according to (A) respectively (B) above will become $$\hat{I}=\frac{V_s-V_m}{2}\sqrt{\frac{C}{L}} \qquad (2a)$$

$$\hat{\imath}=\frac{V_s+V_m}{4n}\sqrt{\frac{C}{L}} \qquad (4a)$$

The transmission pulse is thus a superposition of half sinusoidal pulse with the amplitude $$\frac{V_s-V_m}{2}\sqrt{\frac{C}{L}}$$

and a pulse consisting of $n$ full sine waves with the amplitude $$\frac{V}{4}\sqrt{\frac{C}{L}}$$

where $n$ is an integer. On the transmitting side the pulses are added, while they are subtracted on the receiving side, as the half sinusoidal current pulse in the transmitting circuit has another sign than in the receiving circuit. The instantaneous value $I_s$ of the transmission current pulse on the transmitting side will thus be:

$$I_s=\frac{1}{2}\sqrt{\frac{C}{L}}\left(\frac{V_s+V_m}{4n}\sin 2n\alpha+(V_s-V_m)\sin\alpha\right)180° \qquad (5)$$

and the corresponding value on the receiving side will be $$I_m=\frac{1}{2}\sqrt{\frac{C}{L}}\left(\frac{V_s+V_m}{4n}\sin 2n\alpha-(V_s-V_m)\sin\alpha\right)180° \qquad (6)$$

in these equations $\alpha$ signifies the current angle of the pulse.

The voltage of the common transmission medium is only determined by the current according to (B) and the voltage drop across the capacity $C_t$ of the transmission medium to earth. As the current according to (B) consists of $n$ full sine waves, the voltage $U_t$ of the transmission medium will vary according to $n$ full periods of a cosine function, the peak to peak value of which is varying between zero and a value $$\hat{\check{U_t}}=\frac{V_s+V_m}{4}\left(4-\frac{1}{n^2}\right) \qquad (3a)$$

If $n=1$ is selected, the capacity $C_t$ shall be $$\frac{2C}{3}$$

according to Equation 1 and if the voltage $V_m$ of the receiving side is supposed to be zero at the starting of the transmission pulse, the following instantaneous values of the current $I_s$ and $I_m$ are obtained.

$$I_s=\frac{V}{2}\sqrt{\frac{C}{L}}\left(\frac{1}{2}\sin 2\alpha+\sin\alpha\right)$$

$$I_m=\frac{V}{2}\sqrt{\frac{C}{L}}\left(\frac{1}{2}\sin 2\alpha-\sin\alpha\right)$$

The voltage $U_t$ will be a cosine function having two full periods and a peak to peak amplitude varying between 0 and $^{15}\!/_{16}$ v.

The currents I and $i$ and the currents $I_s$ and $I_m$ obtained by superposition the first mentioned currents on the transmitting and receiving sides respectively are shown for $n=1$ in Fig. 3 and for $n=2$ in FIG. 5. The voltage $U_t$ on the transmission medium T is shown for $n=1$ in FIG. 4 and for $n=2$ in FIG. 6.

FIGS. 4 and 6 show that the voltage of the common transmission medium is zero at the end of the transmission pulse, i.e. no energy is left in the capacity $C_t$, if this capacity is $$C_t=\frac{2C}{4n^2-1}$$

where $n$ can be the integers 1, 2 . . . .

If communication between more than two circuits e.g. 3 or 4 is desired in the same channel, the capacity must of course be increased to $$\frac{3C}{4n^2-1}$$

respectively $$\frac{4C}{4n^2-1}$$

or generally $$\frac{P.C}{4n^2-1}$$

where P is the number of circuits, which are connected to the same channel. Such cases are, however, not very common within the telephone technic.

In great electronic telephone stations the subscribers' circuits are generally divided in several groups, and each such primary group is over electronic contacts available for several secondary groups, to which trunk circuits are connected. FIG. 7 shows a diagram of such a connection. The subscriber circuit $A_b$ is over the contact $K_s$ connected to the transmission medium $T_{prim}$ of the primary circuit. The primary transmission is over an electronic group contact $K_g$ connected to a secondary transmission medium $T_{sek}$, to which a circuit $L_r$ is connected via a contact $K_m$. The capacities $C_{prim}$ and $C_{sek}$ respectively of the two transmission media to earth are suitably so selected that $$C_{prim}=C_{sek}=\frac{C}{4n^2-1}$$

Generally a primary subscriber group is larger than a secondary line group. It can be advantageous to make $C_{prim}$ larger than $$\frac{p.C}{4n^2-1}$$

and $C_{sek}$ in the corresponding degree smaller so that $$C_{prim}+C_{sek}=\frac{2C}{4n^2-1}$$

I claim:

1. In a multiplexing communication system comprising a plurality of subscriber stations, each having transmitting and receiving means connectable to an electrical transmission medium through an energizable switching means, said transmitting and receiving means including a first resonant circuit connected between two terminals of said transmitting and receiving means and one terminal of the electrical transmission medium through said switching means, said resonant circuit being resonant to a frequency corresponding to a period of time which is substantially twice the pulse time said switching means is energized and connects said transmitting and receiving means to said medium, the improvement comprising, in combination, a capacitive circuit electrically connected between said transmission medium and one of said two terminals, said capacitive circuit together with said first resonant circuit forming a second resonant circuit during pulse times said switching means is energized, said second resonant circuit being resonant to a frequency substantially an even multiple of the resonant frequency of said first resonant circuit.

2. In a multiplexing communication system comprising a plurality of subscriber stations, each having transmitting and receiving means connectable to an electrical transmission medium through an energizable switching means for communicating between said stations, said transmitting and receiving means including a first resonant circuit having a first capacitor shunt connected across terminals of said transmitting and receiving means and an inductance means serially connected between one side of said capacitor and one terminal of said switching means, said first resonant circuit being resonant to a frequency corresponding to a period of time which is substantially twice a period said switching means is energized and connects said transmitting and receiving means to said transmitting medium, the improvement comprising, in combination, a capacitive circuit electrically connected to another terminal of said switching means at one side thereof and to a common electrical potential for said system at another side thereof, said capacitive circuit together with said first resonant circuit forming a second resonant circuit during pulse times said contact is energized, said second resonant circuit being resonant to a frequency substantially an even multiple of the resonant frequency of said first resonant circuit.

3. In a multiplexing communication system as described in claim 2 for interconnecting at least two of said plurality of stations through said transmission medium for communication therebetween, the capacitance of said capacitive circuit being equivalent to $$\frac{C \cdot p}{4n^2-1}$$

where C is the capacitance of said shunt-connected capacitor, $n$ is an integer and $p$ is the number of stations connected to the transmission medium.

4. In a multiplexing communication system comprising a plurality of subscriber stations each having transmitting and receiving means, a plurality of transmission mediums for electrical energy, at least one of said plurality of stations being operably connected to one of said mediums through an energizable contact means having several terminals connected to said mediums for electrically interconnecting stations connected to said mediums through said contact means, said transmitting and receiving means including a first resonant circuit having a capacitor shunt connected across terminals of said transmitting and receiving means and an inductance means serially connected between one side of said shunt capacitor and a terminal of said contact means, said first resonant circuit being resonant to a frequency substantially twice the period said contacts are energized to electrically interconnect said transmitting and receiving means to said mediums, the improvement comprising, in combination, a capacitor electrically connected to a capacitor electrically connected to each transmission medium and forming a second resonant circuit together with said first resonant circuit of a subscriber station connected to the same transmission medium during pulse times when said contact means is energized, said second resonant circuit being resonant to a frequency substantially an even multiple of the resonant frequency of said first resonant circuit.

References Cited in the file of this patent

UNITED STATES PATENTS

| | | |
|---|---|---|
| 2,718,621 | Haard et al. | Sept. 20, 1955 |
| 2,833,862 | Tolson | May 6, 1958 |
| 2,870,259 | Norris | Jan. 20, 1959 |